United States Patent [19]

Eppert, Jr.

[11] Patent Number: 5,409,992
[45] Date of Patent: Apr. 25, 1995

[54] CALENDERABLE BLENDS CONTAINING BROAD MOLECULAR WEIGHT DISTRIBUTION PROPYLENE POLYMER MATERIAL

[75] Inventor: Stanley E. Eppert, Jr., New Castle County, Del.

[73] Assignee: Himont Incorporated, Wilmington, Del.

[21] Appl. No.: 202,535

[22] Filed: Feb. 28, 1994

[51] Int. Cl.$^6$ .............. C08L 23/10; C08L 23/04; C08L 23/16; C08L 53/00
[52] U.S. Cl. ................................ 525/88; 525/89; 525/240
[58] Field of Search ................. 525/240, 88, 89

[56] References Cited

U.S. PATENT DOCUMENTS

| | | | |
|---|---|---|---|
| 5,212,246 | 5/1993 | Ogale | 525/240 |
| 5,218,052 | 6/1993 | Cohen et al. | 525/240 |
| 5,286,552 | 2/1994 | Lesca et al. | 525/240 |
| 5,286,564 | 2/1994 | Cecchin et al. | 525/240 |
| 5,286,791 | 2/1994 | De Nicola et al. | 525/71 |
| 5,302,454 | 4/1994 | Cecchin et al. | 525/240 |

FOREIGN PATENT DOCUMENTS

| | | |
|---|---|---|
| 0098077 | 6/1983 | European Pat. Off. . |
| 0385765 | 2/1990 | European Pat. Off. . |
| 59-172507 | 3/1983 | Japan . |

Primary Examiner—Carman J. Seccuro, Jr.

[57] ABSTRACT

Disclosed are calenderable blends consisting essentially of (A) a heterophasic olefin polymer composition and (B) a broad molecular weight distribution propylene polymer material, and film or sheet materials thereof.

10 Claims, No Drawings

_5,409,992_

CALENDERABLE BLENDS CONTAINING BROAD MOLECULAR WEIGHT DISTRIBUTION PROPYLENE POLYMER MATERIAL

FIELD OF INVENTION

This invention relates to calenderable blends containing propylene polymer material. In particular, this invention relates to calenderable blends containing a broad molecular weight distribution propylene polymer material.

BACKGROUND OF THE INVENTION

Heterophasic olefin polymer materials have been widely used in various applications, such as film, sheets and other shaped articles, because of their excellent physical and mechanical properties. However, some heterophasic olefin polymer materials when used in calendering processes have been found to be unsuitable for producing products having higher stiffness.

Thus, there is a need in the industry for heterophasic olefin polymer materials which are calenderable, and provide high stiffness.

SUMMARY OF THE INVENTION

Accordingly, this invention provides calenderable blends consisting essentially of:

(A) from 10 to 95%, by weight, of a heterophasic olefin polymer composition; and (B) from 90 to 5%, by weight, of a broad molecular weight distribution propylene polymer material.

In another embodiment this invention provides film or sheet material from blends of (A) from 10 to 95%, by weight of a heterophasic olefin polymer composition; and (B) from 90 to 5%, by weight, of a broad molecular weight distribution propylene polymer material.

DETAIL DESCRIPTION OF THE INVENTION

All parts and percentages used in this application are by weight unless otherwise specified. Ambient or room temperature is approximately 25° C.

The heterophasic olefin polymer composition of component (A) is selected from the group consisting of:

(1) an olefin polymer composition consisting essentially of:

(a) from 10 to 60%, preferably 20 to 50%, of a propylene homopolymer with isotactic index greater than 90%, preferably from 98 to 99%, or a crystalline propylene copolymer with ethylene, with a $CH_2=CHR$ olefin where R is a $C_{2-6}$ alkyl radical, or combinations thereof, containing over 85% by weight of propylene and having an isotactic index greater than 85 to 99%;

(b) from 8 to 40% of a semi-crystalline, ethylene copolymer fraction containing ethylene and propylene, having an ethylene content of greater than 50%, preferably from 55 to 99% and insoluble in xylene at room temperature;

(c) from 30 to 60%, preferably 30 to 50%, of an amorphous ethylene-propylene copolymer fraction, optionally containing 1–10% of a diene, preferably 1 to 5% of a diene, soluble in xylene at room temperature and containing 40 to 70% by weight ethylene; or (2) an olefin polymer composition consisting essentially of:

(a) from 10 to 50%, preferably 10 to 40%, and most preferably 20 to 35%, of a propylene homopolymer having an isotactic index of 80 to greater than 99%, preferably 85 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin as defined in (a) (ii), said copolymer containing over 80%, preferably from 85 to 99%, and most preferably from 90 to 99%, propylene and having an isotactic index greater than 80, preferably greater than 85 to 99%;

(b) from 5 to 20%, preferably 7 to 15%, of a semicrystalline, essentially linear copolymer fraction having a crystallinity of about 20 to 60%, wherein the copolymer is selected from the group consisting of (i) ethylene and propylene containing over 55% ethylene, (ii) ethylene, propylene, and an alpha-olefin as defined in (a) (ii) containing from 1 to 10% of the alpha-olefin and over 55% up to 98%, preferably from 80 to 95%, of both ethylene and alpha-olefin, and (iii) ethylene and an alpha-olefin as defined in (a) (ii) containing over 55% up to 98%, preferably from 80 to 95%, of said alpha-olefin, which copolymer is insoluble in xylene at room or ambient temperature; and (c) from 40 to 80%, preferably 50 to 70%, of a copolymer fraction selected from the group consisting of a copolymer of (i) ethylene and propylene containing from 20% to less than 40%, preferably 25 to 38%, of ethylene and, (ii) ethylene, propylene, and an alpha-olefin as defined in (a) (ii), wherein the alpha-olefin is present in an amount of 1 to 10%, preferably 1 to 5%, and the amount of ethylene and alpha-olefin present is from 20% to less than 40%, and (iii) ethylene and an alpha-olefin as defined in (a) (ii) containing from 20% to less than 40%, preferably 25 to 38%, of the alpha-olefin, and optionally with 0.5 to 10%, preferably 1 to 5% of a diene, said copolymer fraction being soluble in xylene at ambient temperature, and having an intrinsic viscosity of from 1.5 to 4.0 dl/g, and preferably from 1.7 to 3.0 dl/g; wherein the total amount of the (b) and (c) fractions, based on the total olefin polymer composition, is from 50% to 90%, preferably 65% to 80%, and the weight ratio of (b)/(c) being less than 0.4, preferably 0.1 to 0.3.

Component (A)(1) has at least one melting peak, determined by DSC, present at temperatures higher than 140° C.; a flex modulus of less than 700 MPa, preferably from 200 to 500 MPa; a VICAT softening point greater than 50° C.; a Shore A hardness greater than 80 and a Shore D hardness greater than 30; a tension set, at 75% strain, lower than 60% and preferably from 20 to 50%; a tensile stress of greater than 6 MPa, and preferably from 8 to 20 MPa and a notched Izod resilience at −20° and 40° C. greater than 600 J/m.

The component (A)(2) used in the present invention has at least one melt peak, determined by DSC, present at temperatures higher than 120° C., and at least one peak, relative to the vitreous transition, present at temperatures from −10° C. and −35° C.; a flexural modulus of less than 150 MPa, generally from 20 and 100 MPa; a tensile strength at yield of from 10 to 20 MPa; elongation at break over 400%; a tension set, at 75% strain, from 20% to 50%; a Shore D hardness from 20 and 35; and do not break (no brittle impact failure)

when an IZOD impact test is conducted at −50° C.; preferably the haze values are less than 40%, most preferably less than 35%.

Component (A)(2) is the preferred heterophasic olefin polymer composition used in the blends of the present invention.

The C$_{4-10}$ alpha-olefin useful in the preparation of components (A)(1) and (A)(2) described above include butene-1, pentene-1, hexene-1, 4-methyl-l-pentene and octene. Butene-1 is particularly preferred.

The diene, when present, in components (A)(1) and (A)(2), is typically a butadiene, 1,4-hexadiene, 1,5-hexadiene, or ethylidiene norbornene diene monomer.

Component (B) is a propylene polymer material having a broad molecular weight distribution, Mw/Mn, measured by gel permeation chromatography, of from 5 to 60, preferably from 10 to 60, and most preferably from 12 to 40; a polydispersity index, PI, of from 6.1 to 14.5; a melt flow rate of from 0.5 to 50, preferably from 3 to 30, and a xylene insoluble at 25° C. of greater than or equal to 94, and preferably greater than or equal to 96%.

The propylene polymer material of component (B) is a homopolymer of propylene or an ethylene-propylene rubber impact modified homopolymer of propylene, wherein the propylene homopolymer has a broad molecular weight distribution. Preferably, said propylene polymer material is a homopolymer of propylene.

In the blends of the present invention, preferably component (A) is present in an amount of from 25% to 75%, and component (B) is present in an amount of from 75% to 25%.

The broad molecular weight distribution propylene polymer material described above and used in the present invention, can be prepared by sequential polymerization in at least two stages, in the presence of Ziegler-Natta catalyst supported on a magnesium halide in active form.

Preferably, said catalyst contains, as an essential element, a solid catalyst component (a) comprising a titanium compound having at least one titanium-halogen bond and an electron donor compound, both supported on a magnesium halide in active form, and are characterized in that they are capable of producing propylene polymers having a xylene insoluble fraction at 25° C. greater than or equal 94%, preferably greater than or equal to 96%, and have a sensitivity to molecular weight regulators high enough to produce propylene homopolymer having a melt flow rate (MFR) of less than or equal to 0.5 and greater than or equal to 50 g/10 min.

Methods of preparing the broad molecular weight distribution propylene polymer material of (B) of this invention are described in U.S. Ser. No. 07/891,374, filed May 29, 1992, now U.S. Pat. No. 5,286,791 the description of which is incorporated herein by reference.

The heterophasic olefin polymer materials can be prepared with a polymerization process comprising at least two stages, where in the first stage the propylene or propylene and ethylene or said alpha-olefin or propylene, ethylene or said alpha-olefin are polymerized to form component (a) of (A)(1) or (A)(2), and in the following stages the mixtures ethylene and propylene or said alpha-olefin or ethylene, propylene and said alpha-olefin, and optionally a diene, are polymerized to form components (b) and (c) of (A)(1) or (A)(2).

The polymerization can be conducted in liquid phase, gas phase, or liquid-gas phase using separate reactors, all of which can be done either by batch or continuously. For example, it is possible to carry out the polymerization of component (a) using liquid propylene as diluent, and the polymerization of components (b) and (c) in gas phase, without intermediate stages except for the partial degassing of the propylene. This is the preferred method.

The polymerization reactions are carried out in an inert atmosphere in the presence of an inert hydrocarbon solvent or of a liquid or gaseous monomer.

Suitable inert hydrocarbon solvents include saturated hydrocarbons, such as propane, butane, hexane and heptane.

Hydrogen can be added as needed as a chain transfer agent for control of the molecular weight.

The reaction temperature in the polymerization of component (a) and for the polymerization of components (b) and (c), can be the same or different, and is generally from 40° C. to 90° C., preferably 50° to 80° C. for the polymerization of component (a), and 40° to 65° C. for the polymerization of components (b) and (c).

The pressure of the polymerization of component (a), if carried out in liquid monomer, is the one which competes with the vapor pressure of the liquid propylene at the operating temperature used, eventually modified by the vapor pressure of the small quantity of inert diluent used to feed the catalyst mixture, and the over pressure of optional monomers and the hydrogen used as molecular weight regulator.

The pressure of the polymerization of components (b) and (c), if done in gas phase, can be from 5 to 30 atm. The residence times relative to the two stages depend on the desired ratio between fraction (a) and (b)+(c), and are usually from 15 min. to 8 hours.

The catalyst used in the polymerization comprises the reaction product of 1) a solid component containing a halogen-containing titanium compound and an electron-donor compound (internal donor) supported on an activated magnesium chloride, 2) a non-halogen containing Al-trialkyl compound and 3) an electron-donor compound (external donor).

Suitable titanium compounds include those with at least one Ti-halogen bond, such as halides and alkoxy halides of titanium.

In order to obtain these olefin polymer compositions in the form of flowable spherical particles having a high bulk density, the solid catalyst component must have a) a surface area smaller than 100 m$^2$/g, preferably between 50 and 80 m$^2$/g, b) a porosity from 0.25 to 0.4 cc/g. and c) an X-ray spectrum, where the magnesium chloride reflections appear, showing the presence of a halo between the angles 2$\theta$ of 33.5° and 35° and by the absence of the reflection at 2$\theta$ of 14.95°. The symbol $\theta$=Bragg angle.

The solid catalyst component is prepared by forming an adduct of magnesium dichloride and an alcohol, such as ethanol, propanol, butanol and 2-ethylhexanol, containing generally 3 moles of alcohol per mole of MgCl$_2$, emulsifying the adduct, cooling the emulsion quickly to cause the adduct to solidify into spherical particles, and partially dealcoholating the particulate adduct by gradually increasing the temperature from 50° C. to 130° C. for a period of time sufficient to reduce the alcohol content from 3 moles to 1–1.5 moles per mole of MgCl$_2$. The partially dealcoholated adduct is then suspended in TiCl$_4$ at 0° C., such that the concentration of adduct to TiCl₄ is 40–50 g/l TiCl₄. The mixture is then heated to a temperature of 80° C. to 135° C. for a period of about 1–2 hr. When the temperature reaches 40° C., sufficient electron donor is added so that the desired molar ratio of Mg to electron donor is obtained.

An electron-donor compound selected preferably among the alkyl, cycloalkyl, and aryl phthalates, such as for example diisobutyl, di-n-butyl, and di-n-octyl phthalate, is added to the TiCl₄.

When the heat treatment period has ended, the excess hot TiCl₄ is separated by filtration or sedimentation, and the treatment with TiCl₄ is repeated one or more times. The solid is then washed with a suitable inert hydrocarbon compound, such as hexane or heptane, and dried.

The solid catalyst component typically has the following characteristics:

| | |
|---|---|
| Surface area: | less than 100 m²/g, preferably between 50 and 80 m²/g |
| Porosity: | 0.25–0.4 cc/g |
| Pore volume distribution: | 50% of the pores have a radius greater than 100 angstroms |
| X-ray spectrum: | where the Mg chloride reflections appear, showing a halo with maximum intensity between angles of 2θ of 33.5° and 35°, and where the reflection at 2θ of 14.95° is absent. |

The catalyst is obtained by mixing the solid catalyst component with a trialkyl aluminum compound, preferably triethyl aluminum and triisobutyl aluminum, and an electron-donor compound.

Various electron donor compounds are known in the art. The preferred electron donor compounds are those silane compounds having the formula $R'R''Si(OR)_2$ where $R'$ and $R''$ may be the same or different and are $C_{1-18}$ normal or branched alkyl, $C_{5-18}$ cycloalkyl, or $C_{6-18}$ aryl radicals, and R is a $C_{1-4}$ alkyl radical. Typical silane compounds which may be used include diphenyldimethoxysilane, dicyclohexyldimethoxysilane, methyl-t-butyldimethoxysilane, diisopropyldimethoxysilane, dicyclopentyldimethoxysilane, cyclohexylmethyldimethoxysilane and phenyltrimethoxysilane.

The Al/Ti ratio is typically between 10 and 200 and the Al/silane molar ratio between 1/1 and 1/100.

The catalysts may be precontacted with small quantities of olefin monomer (prepolymerization), maintaining the catalyst in suspension in a hydrocarbon solvent and polymerizing at a temperature from room temperature to 60° C. for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

The content and amount of catalyst residue in the thermoplastic olefin polymers of this invention is sufficiently small so as to make the removal of catalyst residue, typically referred to as deashing, unnecessary.

The olefin polymer materials prepared with the aforementioned catalyst are in spheroidal particle form, and the particles have a diameter from 0.5 to 7 mm.

The blends of the invention can be prepared by mechanically blending component (A) and component (B) by conventional mixing processes, in conventional compounding equipment.

The blends of the present invention may also contain conventional additives, for example, antioxidants, stabilizers, extender oils, such as paraffinic and naphthenic oils, pigments and flame retardants.

The present invention will be illustrated in greater detail with reference to the examples of the invention set forth below.

Unless otherwise specified, the following analytical methods are used to characterize the heterophasic olefin polymer composition, broad molecular weight distribution propylene polymer material, and the blends obtained therefrom.

| Analytical Methods | |
|---|---|
| Properties | Method |
| Melt Flow Rate, g/10 min. | ASTM-D 1238, condition L |
| Ethylene, wt % | I. R. Spectroscopy |
| Flexural Modulus, kspi | ASTM-D 790 |
| Molecular Weight Distribution, Mw/Mn | Determined by Waters 150-C ALC/GPC, in trichlorobenzene at 145° C. with a differential refractive index detector. |
| Polydispersity Index, P.I. | Measurement of the molecular weight distribution in the polymer, $M_w/M_n$. To determine the P.I. value, the modulus separation at low modulus value, e.g., 500 Pa, is determined at a temperature of 200° C. by using a RMS-800 parallel-plates rheometer model marketed by RHEOMETRICS (USA), operating at an oscillation frequency which increases from 0.1 rad/second to 100 rad/second. From the modulus separation value, the P.I. value can be derived using the following equation: P.I. = 54.6 (modulus separation)$^{-1.76}$, | wherein the modulus separation is defined as:

$$\text{modulus separation} = \frac{\text{frequency at } G' = 500 \text{ Pa}}{\text{frequency at } G'' = 500 \text{ Pa}}$$

wherein $G'$ is the storage modulus and $G''$ is the low modulus.

EXAMPLES 1–3

Component (A), a heterophasic olefin polymer material, in pellet form, obtained by sequential polymerization in at least two stages, containing 35% propylene homopolymer, 52% amorphous ethylene-propylene copolymer rubber fraction having an ethylene content of 52%, and 13% semi-crystalline ethylene-propylene copolymer fraction having an ethylene content of 96% and is insoluble in xylene at room temperature, and component (B), a propylene homopolymer, in pellet form, having a Mw/Mn of 16, a P.I of 14.3, and MFR of 6.3, are dry blended with, based on parts per hundred parts of the total blend, TiO₂, Irganox B-225 2,2-bis[[3-[3,5-bis(1,1-dimethylethyl)-4-hydroxyphenyl]-1-oxoproxy]methyl]-1,3-propanediyl-3,5-bis(1,1-dimethylethyl)-4-hydroxybenzene propanoate stabilizer and tris(2,4-di-tert-butylphenyl)phosphite stabilizer in a 50:50 blend, calcium stearate and Erucamide cis-13-docoseno-amide, and compounded on a single screw extruder.

100 to 200 grams of the blend prepared above was then mill rolled on a 2-roll mill at a temperature of from 200° to 210° C. and worked into a uniform melt. The melted product removed from the rolls provide sheet samples of 20 mil thickness.

The amounts of the ingredients used in the blend, and physical properties thereof are set forth below in Table 1.

COMPARATIVE EXAMPLE 1

Prepared according to Example 1, except that component (B) and TiO$_2$ were excluded.

The amounts of the ingredients used in the composition, and physical properties thereof are set forth below in Table 1.

TABLE 1

| Ingredients | Ex. 1 | Ex. 2 | Ex. 3 | C-1 |
|---|---|---|---|---|
| Component (A) | 75 | 50 | 25 | 100 |
| Component (B) | 25 | 50 | 75 | — |
| TiO$_2$ | 4 | 4 | 4 | — |
| B-225 | 0.25 | 0.25 | 0.25 | 0.25 |
| CaSt | 0.20 | 0.20 | 0.20 | 0.20 |
| Erucamide | 0.20 | 0.20 | 0.20 | 0.20 |
| Properties Flex. Mod., kpsi | 147 | 210 | 276 | 55 |

It can be seen that the blends of the present invention show a substantial increase in flexural modulus, as compared to component (A).

EXAMPLES 4-7

A blend is prepared according to the procedure of Example 1, except that a heterophasic olefin polymer material, in pellet form, obtained by sequential polymerization in at least two stages, containing about 30% of a propylene-ethylene random copolymer having an ethylene content of 3.3%, 63% of an amorphous ethylene-propylene copolymer rubber fraction containing 31.1% ethylene and 7% of a semi-crystalline ethylene-propylene copolymer fraction having an ethylene content of 51.9% and has a xylene soluble content of 51% was used as component (A).

The amounts of the ingredients used in the composition, and physical properties thereof are set forth below in Table 2.

COMPARATIVE EXAMPLE 2

Prepared according to the procedure of Example 4, except that component (B) and TiO$_2$ were excluded.

TABLE 2

| Ingredients | Ex. 4 | Ex. 5 | Ex. 6 | Ex. 7 | C-2 |
|---|---|---|---|---|---|
| Component (A) | 75 | 50 | 25 | 10 | 100 |
| Component (B) | 25 | 50 | 75 | 90 | — |
| TiO$_2$ | 4 | 4 | 4 | 4 | — |
| B-225 | 0.25 | 0.25 | 0.25 | 0.25 | 0.25 |
| CaSt | 0.20 | 0.20 | 0.20 | 0.20 | 0.25 |
| Erucamide | 0.20 | 0.20 | 0.20 | 0.20 | 0.25 |
| Properties Flex. Mod., kpsi | 73 | 149 | 232 | 296 | 15 |

It can be seen that the blends of the present invention show a substantial increase in flexural modulus, as compared to component (A).

When calendered, film materials prepared from the blends of the present invention can range in thickness of from 1 mil to 10 mils, and sheet materials in thicknesses up to 75 mil, preferably from 10 mil to 75 mil. Said films or sheets of the present invention are suitable for decals/labels, thermoformable sheets and veneers.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A calenderable blend consisting essentially of:
    (A) from 10 to 95% of a heterophasic olefin polymer composition prepared by sequential polymerization in at least two stages selected from the group consisting of:
        (1) an olefin polymer composition consisting essentially of:
            (a) 10 to 60% of a propylene homopolymer with isotactic index greater than 90 to about 99%, or a crystalline propylene copolymer with ethylene, with a CH$_2$=CHR olefin where R is a 2-6 carbon alkyl radical, or combinations thereof, containing over 85% by weight of propylene and having an isotactic index greater than 85 to 99%;
            (b) 8 to 40% of a semi-crystalline, ethylene copolymer fraction containing ethylene and propylene, having an ethylene content of greater than 50% and insoluble in xylene at room temperature; and
            (c) 30 to 60% of an amorphous ethylene-propylene copolymer fraction, optionally containing small proportions of a diene, soluble in xylene at room temperature and containing 40 to 70% by weight ethylene; and
        (2) an olefin polymer composition consisting essentially of:
            (a) from about 10 to 50% of a propylene homopolymer having an isotactic index greater than 80, or a copolymer selected from the group consisting of (i) propylene and ethylene, (ii) propylene, ethylene and a CH$_2$=CHR alpha-olefin, where R is a C$_{2-8}$ straight or branched alkyl, and (iii) propylene and an alpha-olefin as defined in (a) (ii), said copolymer containing over 80% propylene and having an isotactic index greater than 80;
            (b) from about 5 to 20% of a semi-crystalline, essentially linear copolymer fraction having a crystallinity of about 20 to 60%, wherein the copolymer is selected from the group consisting of (i) ethylene and propylene containing over 55% ethylene, (ii) ethylene, propylene, and an alpha-olefin as defined in (a) (ii) containing from 1 to 10% of the alpha-olefin and over 55% of both ethylene and alpha-olefin, and (iii) ethylene and an alpha-olefin as defined in (a) (ii) containing over 55% of said alpha-olefin, which copolymer is insoluble in xylene at room or ambient temperature; and
            (c) from about 40 to 80% of a copolymer fraction selected from the group consisting of a copolymer of (i) ethylene and propylene, wherein the copolymer contains from 20% to less than 40% ethylene and, (ii) ethylene, propylene, and an alpha-olefin as defined in (a) (ii) wherein the alpha-olefin is present in an amount of 1 to 10% and the amount of ethylene and alpha-olefin present is from 20% to less than 40%, and (iii) ethylene and an alpha-olefin as defined in (a) (ii) containing from 20% to less than 40% of the alpha-olefin, and optionally with 0.5 to 10% of a diene, said copolymer fraction being soluble in xylene at ambient temperature, and having an intrinsic viscosity of from 1.5 to 4.0 dl/g; wherein the total of the (b) and (c) fractions, based on the total olefin polymer composition, is from 50% to 90%, and the weight ratio of (b)/(c) being less than 0.4; and (B) from 90 to 5%, by weight, of a broad molecular weight distribution propylene polymer material prepared by sequential polymerization in at least two stages having a Mw/Mn of 5 to a polydispersity index of 6.1 to 14.5; a melt flow rate of 0.5 to 50 and a xylene insolubles at 25° C. of greater than or equal to 94%.

2. The blend of claim 1, wherein said heterophasic olefin polymer composition is (A)(1).

3. The blend of claim 2, wherein the broad molecular weight distribution propylene polymer material (B) is a propylene homopolymer.

4. The blend of claim 1, wherein said heterophasic olefin polymer composition is (A)(2).

5. The blend of claim 4, wherein the broad molecular weight distribution propylene polymer material (B) is a propylene homopolymer.

6. A film or sheet material comprising a blend of claim 1.

7. The film or sheet material of claim 6, wherein said heterophasic olefin polymer composition is (A)(1).

8. The film or sheet material of claim 7, wherein (A)(1) is present in an amount of 25 to 75% and (B) is present in an amount of from 75 to 25%.

9. The film or sheet material of claim 6, wherein said heterophasic olefin polymer composition is (A)(2).

10. The film or sheet material of claim 9, wherein (A)(2) is present in an amount of 25 to 75% and (B) is present in an amount of from 75 to 25%.

* * * * *

UNITED STATES PATENT AND TRADEMARK OFFICE
CERTIFICATE OF CORRECTION

PATENT NO. : 5,409,992
DATED : April 25, 1995
INVENTOR(S) : Stanley E. Eppert, Jr.

It is certified that error appears in the above-indentified patent and that said Letters Patent is hereby corrected as shown below:

At col. 9, line 9, insert --60;-- after "to".

Signed and Sealed this

Twenty-fifth Day of June, 1996

Attest:

BRUCE LEHMAN

Attesting Officer     Commissioner of Patents and Trademarks